United States Patent
Wu et al.

(10) Patent No.: US 6,510,451 B2
(45) Date of Patent: Jan. 21, 2003

(54) SYSTEM FOR COMPLETING A MULTI-COMPONENT TASK INITIATED BY A CLIENT INVOLVING WEB SITES WITHOUT REQUIRING INTERACTION FROM THE CLIENT

(75) Inventors: Jonathan Wu, Mountain View, CA (US); Suman Kumar Inala, Santa Clara, CA (US); Ramakrishna Satyavolu, Santa Clara, CA (US); P Venkat Rangan, San Diego, CA (US); Sreeranga P. Rajan, Santa Clara, CA (US); Neil Daswani, Edison, NJ (US); Anand Rangarajan, Sunnyvale, CA (US); Christoph Kern, Santa Clara, CA (US); Srihari Kumar, Santa Clara, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 0 days.

(21) Appl. No.: 09/419,708

(22) Filed: Oct. 14, 1999

(65) Prior Publication Data

US 2002/0035592 A1 Mar. 21, 2002

(51) Int. Cl.[7] .............................................. G06F 15/16
(52) U.S. Cl. ........................................ 709/203; 209/219
(58) Field of Search ................................ 709/201, 203, 709/205, 216, 219; 705/5, 26; 701/201

(56) References Cited

U.S. PATENT DOCUMENTS

| | | | |
|---|---|---|---|
| 5,619,648 A | | 4/1997 | Canale et al. |
| 5,897,620 A | * | 4/1999 | Walker et al. ............... 705/5 |
| 5,926,798 A | * | 7/1999 | Carter ...................... 705/26 |
| 5,948,040 A | * | 9/1999 | DeLorme et al. ......... 701/201 |
| 6,134,534 A | * | 10/2000 | Walker et al. ............ 705/26 |

* cited by examiner

Primary Examiner—Le Hien Luu
(74) Attorney, Agent, or Firm—Donald R. Boys; Central Coast Patent Agency, Inc.

(57) ABSTRACT

An Internet portal system for accomplishing a multi-component task involving interaction with one or more Internet Web sites includes an Internet-connected server having access to client-related data, an internet-capable client station usable by a client, and software executing on the server for managing individual component tasks in execution of the multi-component task. The software, in response to initiation of a multi-component task specified by the client, defines the component tasks, identifies Internet Web sources for completion of the tasks, manages interaction with the identified Web sites gathering results of the interactions, integrates the gathered results, and communicates final results to the client at the client station. Tasks may be such as trip planning and may include payment for services rendered at Web sites, such as airline reservations, car rentals and the like. A similar system is provided for broadcasting messages to multiple Internet destinations, and further for gathering answers to such messages and communicating the answers to the client.

14 Claims, 5 Drawing Sheets

SYSTEM FOR COMPLETING A MULTI-COMPONENT TASK INITIATED BY A CLIENT INVOLVING WEB SITES WITHOUT REQUIRING INTERACTION FROM THE CLIENT

FIELD OF THE INVENTION

The present invention is in the field of Information propagation and gathering applied to network-based services, and pertains particularly to methods and apparatus including software for dividing a main user task into a plurality of subtasks to be performed by user-selected WEB-based services.

BACKGROUND OF THE INVENTION

The World Wide Web (WWW) as a subset of the well-known Internet network is arguably the largest source for public-access information in the world. For example, anyone with a personal computer, the appropriate software, and a modem can access sites on the Web and obtain information on virtually any subject. As public access and use of the Internet has increased, so too have a variety of WEB-based services catering to many subscribers. Examples of tasks performed by WEB services include airline reservations, hotel reservations, car rental reservations, appointments, memo calendar services and so on. In particular, financial services based on the Internet are becoming widely used due to their ubiquity and ease of access.

Many companies, through innovative applications, have made it progressively easier to use their individual Web services. However, performing a main task that requires the sequential or parallel completion of many sub-tasks is seriously hampered by the fractured nature of the diverse Web services. A user would still be required to visit several WEB services and manually configure such sub-tasks in order to ultimately accomplish the main goal. For example, a generic task needs to be manually decomposed into serviceable subtasks, and each of the subtasks needs to be manually delegated to each of the performing Web services. The results of the subtasks would then have to be manually combined to obtain the resultant task.

What is clearly needed is a method and apparatus that allows a user to accomplish a main task including completion of sub-tasks performed by diverse WEB services without requiring that the user manually visit each WEB service associated with a sub-task and, in some cases, without a user being required to specifically identify a subtask.

SUMMARY OF THE INVENTION

In a preferred embodiment of the present invention an Internet portal system for accomplishing a multi-component task involving interaction with one or more Internet Web sites is provided, comprising an Internet-connected server having access to client-related data; an internet-capable client station usable by a client; and software executing on the server for managing individual component tasks in execution of the multi-component task. The software, in response to initiation of a multi-component task specified by the client, defines the component tasks, identifies Internet Web sources for completion of the tasks, manages interaction with the identified Web sites gathering results of the interactions, integrates the gathered results, and communicates final results to the client at the client station.

In the system in some embodiments individual ones of the component tasks involve payment for services rendered in the interaction with the one or more Internet Web sites, and wherein one of the component tasks is transfer of funds from a client account in payment for the service rendered. Also in preferred embodiments the software provides an input interface for the client to define a task. The input interface may enable the client to participate in defining component tasks and in selecting the Web sites for completion of component tasks.

In some embodiments of the invention the multi-component task involves arranging services for a trip, including one or more of airline reservations, lodging reservations, or reservation of a rental vehicle. In a similar system, also in an embodiment of the invention, the component tasks comprise messages to be sent to individual ones of multiple Web servers.

In these embodiments the messages sent may require answers, and the component tasks further comprise gathering the answers and communicating the answers to the client.

In another aspect of the invention a method for accomplishing a multi-component task involving interaction with one or more Internet Web sites is provided, comprising steps of (a) initiation of a multi-component task by a client via an internet-connected client station to an Internet-connected subscription server having access to client-related data; (b) definition of component tasks by software executing on the Internet-connected subscription server; (c) identification of Web servers for completion of the component tasks; (d) managing of execution of the component tasks by the software, including interaction with the Web servers identified; and (e) gathering and integrating results of the component tasks and communicating final results tot he client at the client station.

In the method individual ones of the component tasks may involve payment for services rendered in the interaction with the one or more Internet Web sites, and one of the component tasks is then transfer of funds from a client account in payment for the service rendered. The software in preferred embodiments provides an input interface for the client to define a task, and the input interface may enable the client to participate in defining component tasks and in selecting the Web sites for completion of component tasks. An example of such a system is one in n the multi-component task involves arranging services for a trip, including one or more of airline reservations, lodging reservations, or reservation of a rental vehicle.

In another embodiment a method according to the invention has tasks comprising sending messages to individual ones of multiple Web servers. In this method the messages sent in some embodiments may require answers, and the component tasks then further comprise gathering the answers and communicating the answers to the client.

In another aspect of the invention an Internet messaging system for broadcasting messages to multiple Internet-connected servers is provided, comprising an Internet-connected server having access to client-related data; an internet-capable client station usable by a client; and software executing on the server for managing the Internet messaging system. The software, in response to initiation by the client from the client station, including specifying a message, identifies Web destinations for broadcast, and broadcasts the message to the identified Web destinations.

In some messaging systems in embodiments of the invention the message requests an answer, and the software gathers the answers and communicates the answers to the client.

In yet another aspect a method for message broadcast on the Internet is provided, comprising steps of (a) specifying a message by a client at an Internet-connected client station; (b) communicating the message to an Internet-connected message server enabled by software; (c) initiating the broadcast by the client from the client station; (d) identifying Web destinations for receipt of the broadcast message; and (e) broadcasting the message by the message server to the identified destinations. In some embodiments the message requests an answer, and there are then further steps for gathering answers to the message and communicating the answers to the client.

In embodiments of the invention described in enabling detail below, for the first time clients of an Internet portal service are enabled to initiate multi-component tasks at a single entry point, and systems operating according to the invention manage completion of the tasks and furnish results to the client.

BRIEF DESCRIPTION OF THE DRAWING FIGURES

DESCRIPTION OF THE PREFERRED EMBODIMENTS

Figure 1:
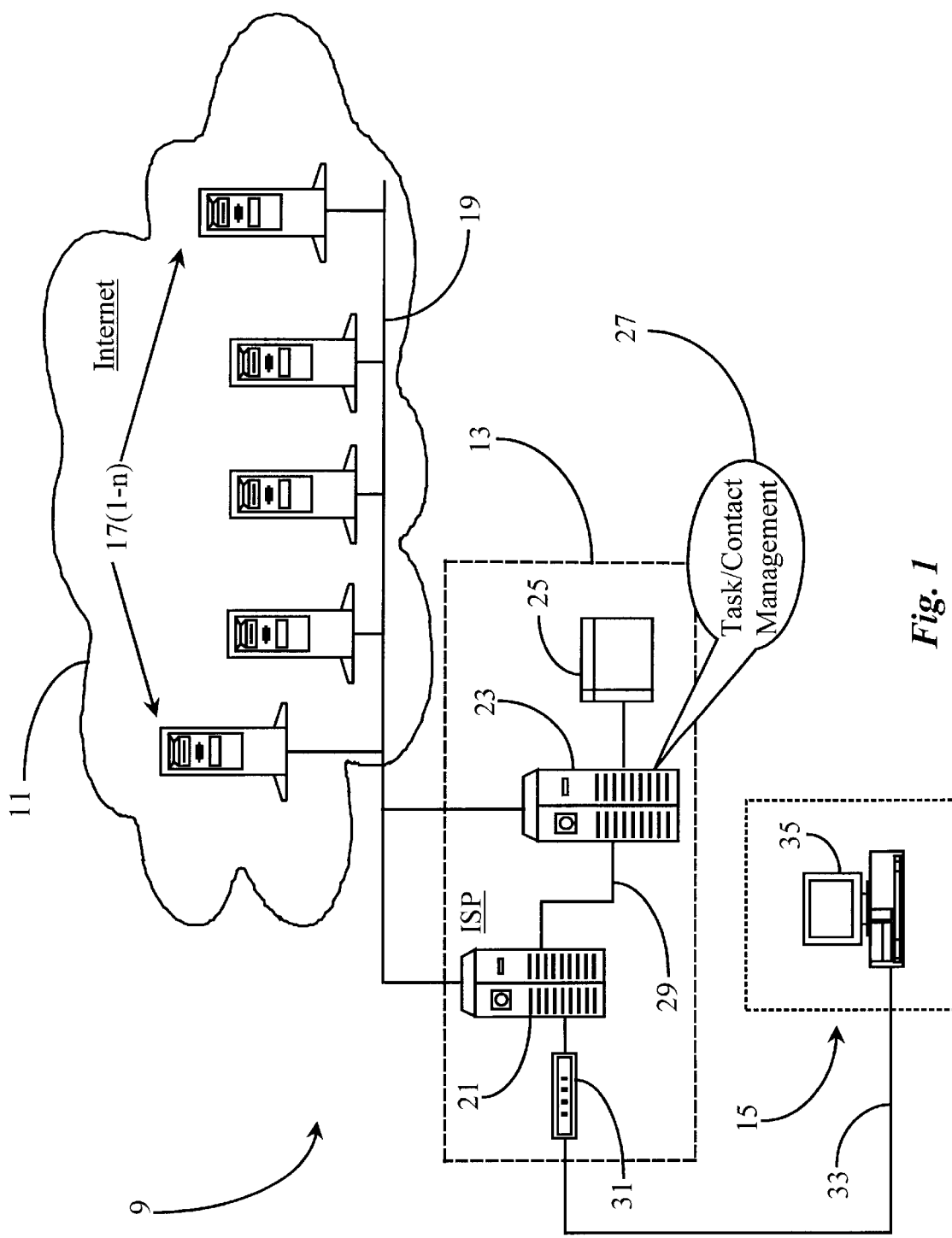
FIG. 1 is an overview of a communication network practicing WEB-service processes according to an embodiment of the present invention.

FIG. 1 is an overview of a communication network 9 practicing WEB-service manifolding according to an embodiment of the present invention. Network 9 comprises a data-packet network 11, an Internet service provider (ISP) 13, and an exemplary user premise 15. Network 11 is, in this embodiment, the well-known Internet network and will hereinafter be termed Internet 11. In other embodiments Internet 11 may instead be a private or corporate wide area network (WAN). The inventor chooses to illustrate Internet 11 as an example in a preferred embodiment because of its large public accessibility.

Within Internet 11 there are illustrated a plurality of WEB servers 17 (1–n) that are connected to an Internet backbone 19. Backbone 19 represents the many connection points and services interconnecting Web sites making up Internet 11. It will be appreciated that the portion of Internet 11 represented herein may take on the scope of a local, regional, or even global network.

WEB servers 17 (1–n) represent any data serving machines (Web sites) that are individually hosted by a like number of separate WEB services. For example, one of WEB servers 17(1–n) may be a hotel reservation server while another may be a car rental server, and so on. For the purpose of the present invention, it is not important to what each server 17 (1–n) is dedicated. It is only important to note that each server 17 (1–n), in this example is responsible for a delegated portion of a general task initiated by a user. It is through the cooperation of all servers 17 (1–n) that a main task may be accomplished.

ISP 13 is configured as a normal ISP according to conventions well-known in the art of Internet access. A main connection server 21 is provided within ISP 13 and adapted to handle Internet connections by virtue of a modem bank represented herein by a modem icon 31. Connection server 21 manages Internet connection by subscribers by virtue of connection to Internet backbone 19. A special server 23 is provided herein and adapted to manage practice of the present invention. Server 23 can, in some embodiments, be described as a portal server responsible for managing WEB-services on behalf of subscribing users. In this regard, it is a WEB server having it's own continuous Internet connection to backbone 19. Server 23 is connected in some embodiments to connection server 21 by a communication link 29, wherein the ISP provides services according to the present invention. In other embodiments server is a portal server in the Web, and not a part of ISP 13.

Server 23 has a data repository 25 connected thereto by a data-link as is known in the art. Repository 25 stores data about users and on behalf of users that subscribe to the management service of the present invention. In addition to specific user data such as identification, account information, and the like, additional profiling data consisting of any data associated with a user profile regarding WEB services that a user may subscribe to may be stored in repository 25 and accessed by server 23 on a user's behalf. Repository 25 may be an optical data-storage system, or any other archival system capable of mass warehousing of data. Repository 25 may be held off line, or on-line and may utilize database software as required for the purpose of organizing, sorting, and managing data.

User premise 15 comprises a personal computer (PC) 35 having Internet access capability by any of a variety of means known in the art. In this example user access to Internet 11 from PC 35 is by virtue of a telephone connection line 33, typically through a Public Switched Telephony Network (PSTN). Other means that may be used to connect PC 35 to Internet 11 include cable connection, integrated services digital network (ISDN) connection, satellite connection, etc. Moreover, Internet-capable devices other than PC 35 may be used to practice the present invention such as a notebook computer, a WEB TV, hand-held devices, and any other known device having a display means and suitable memory for supporting Internet navigation, or navigating through a proxy.

Server 23 has a software application 27 installed therein and configured to facilitate WEB-service manifolding on behalf of a user subscriber base. The term manifolding is used by the inventor to describe a seamless cooperation in the data transfer and dissemination between WEB servers from a single-point interface, which is facilitated by software 27. Software 27 manages task decomposition and delegation as well as contact management in association with WEB servers 17 (1–n) on behalf of a subscribing user. A user operating PC 35 can utilize server 23 and software 27 to delegate several subtasks to appropriate WEB servers such as WEB servers 17 (1–n) from a single interface such that the subtasks are performed by servers 17 (1–n) in order to facilitate a main task for a user. In addition to the ability of decomposing a main task into subtasks and delegating the subtasks to be performed, software 27 also allows a user to multicast various types of messaging to a plurality of WEB servers and to have responses routed back to the user's single point interface.

It will be apparent to one with skill in the art that server 23 is adapted as a user-interfacing WEB server, and as such could logically be held within the premise of ISP 13 as is shown in this embodiment. However, server 23 may be anywhere within Internet 11 without departing from the spirit and scope of the present invention.

Figure 2:
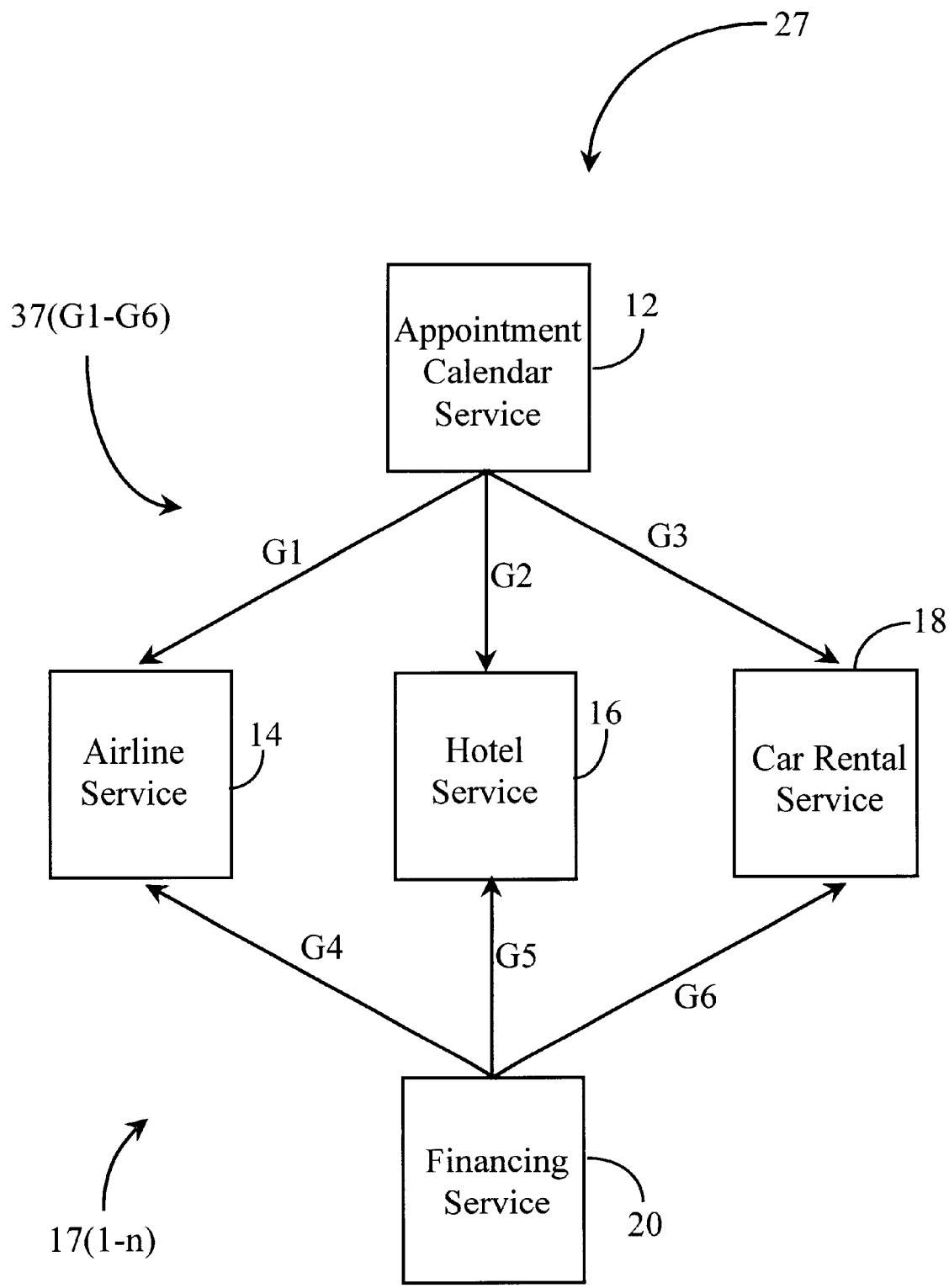
FIG. 2 is a block diagram illustrating task decomposition and delegation of subtasks to various WEB services by virtue of software executing on platforms of FIG. 1 according to an embodiment of the present invention.

FIG. 2 is a block diagram illustrating task decomposition and delegation of subtasks to various WEB services by virtue of the software of FIG. 1 according to an embodiment of the present invention. Software 27 provides a single point interface (browser interface) for a user to delegate a task. For example, if a task defines traveling to a scheduled business meeting that is out of the local area of the user, then subtasks would include such as making travel arrangements, making hotel reservations, acquiring a car rental, and so on.

In this example of methodology, a user enters a main task (appointment for meeting) in a subscribed-to appointment calendar service 12. The appointment calendar service 12, which may represent a service hosted by WEB server 23, or one of WEB servers 17 (1–n) of FIG. 1, may in some embodiments, be the only WEB service a user must interface with to from his or her single-point interface in order to accomplish the task. This is because the abstract definition and entered parameters of the appointment include time, date, location, and whom the appointment is with. Such parameters become rules that effect all of the sub-parameters that must be met in order to enable the user to accomplish the scheduled meeting (main task). Software 27 acts to research what parameters will be necessary to allow the user to make the scheduled appointment according to appointment parameters or rules. This research is accomplished by accessing appropriate databases stored in such as repository 25 of FIG. 1, which contain user profile data regarding subscribed-to WEB services.

Software 27 utilizes helper applications 37 (G1–G6). These helper applications are termed guards by the inventor. In this example there are 6 guards 37 (G1–G6), however there may be more or fewer without departing from the spirit and scope of the present invention. Guards 37 (G1–G6) verify parameters associated with facts known about the appointment and the user-data generic to the user's subscribed-to WEB services. For example, if the appointment is in Chicago and the user is in Maine, then an airline reservation is required. G1 in this case would be set to true. Information about the location of the user may be stored in a database such that if a user proceeds to another location it is known. In other cases a user may simply set the guard manually to true (need reservation).

If G1 is true, then G2 (need hotel accommodations) will likely be true unless a user has made plans to stay with a friend instead of using a hotel. G3 (need a rental car) will also be true provided that a user is not being received in such as a company car once he arrives at the meeting locality. In most cases, a user may set guards to true or false from within the single-point interface. In other instances, guards may be automatically set by default based on known data about a user.

If guards G1–G3 are true, then subtasks representing each part of a main task are propagated to the appropriate WEB services represented by three center blocks labeled Airline Service 14, Hotel Service 16, and Car Rental Service 18. These services represent selected user services. That is to say that if a user, for example, typically patronizes more than one airline, then he or she may select the one service to which a subtask will be delegated. Generally speaking, the service blocks illustrated in this example represent such as WEB servers 17 (1–n) of FIG. 1 as is indicated in the example. In other embodiments, a user may select more than one source for completion of a subtask, and configure criteria such that the sources compete. For example, a user entering an overall task for which an airline reservation is one subtask, may configure for more than one airline reservation server to complete the subtask, and accept as a solution that option that produces (a) lowest fare, (b) fewest connecting flights, (c) certain departure and arrival windows, (d) first class only, or a combination of such criteria.

Returning to the present example, if guards G1–G3 are true, then the services must be compensated (paid) for accomplishing the subtasks. An accounting/financing service 20, subscribed to by the user, arranges transfer of funds from a user account such as an expense account to various WEB services accomplishing subtasks. G4–G6, the payment paths, then would be true because G1–G3 were determined to be true in this example. The subtask delegated to and accomplished by an accounting service is delegated the subtask of paying for the other provided services.

Software 27 in a preferred embodiment is implemented with transaction protocol as known in the art, so that historical data is saved for each transaction and step in a transaction. This feature allows rollback and rollforward actions in case a step fails. There is an example in this disclosure of performance of subtasks in making and paying for an airline reservation. If, in that process, the ticketing subtask fails right before a subscriber is to pay for the reservation, having the transaction mechanism in place allows for error recovery so that no data is lost, and the process can be restarted and successfully completed.

The methodology described above allows a user to simply enter a main task at a single-point interface, and then go about his or her business while subtasks such as acquiring a hotel reservation and booking and paying for a flight are performed by the service in the background. In a preferred embodiment, a single-point interface takes the form of a user's browser interface communicating with software 27 running on a server such as server 23, executing the unique software 27 of the present invention. In another embodiment, a single-point interface may take the form of an interactive WEB page maintained on any Internet-connected server.

All that is required to practice the present invention is a browser interface operated by a user such that the interface may communicate with at least one management server on-line and running software 27. Such a server or servers must have access to such as repository 25 for data access and the capability of multicasting determined subtasks to the appropriate user-selected servers for completion, and receiving and organizing the results. More detail about decomposing a main task into subtasks is presented below.

Figure 3:
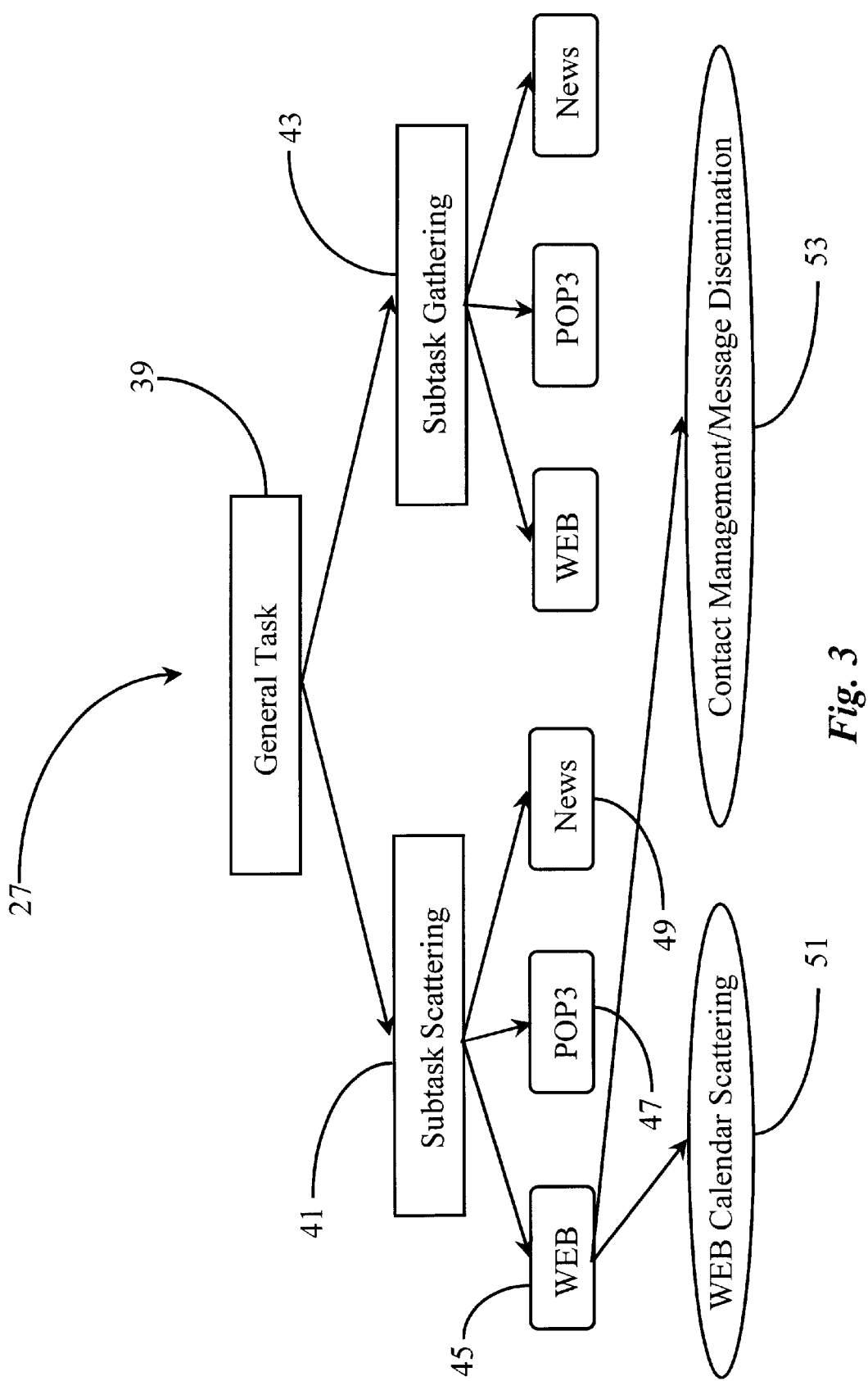
FIG. 3 is a block diagram illustrating subtask gathering and scattering functions and contact management capabilities of software executed in the architecture of FIG. 1 according to an embodiment of the present invention.

FIG. 3 is a block diagram illustrating subtask gathering and scattering functions and contact management capabilities of software 27 of FIG. 1 according to an embodiment of the present invention. Software 27 manages the decomposition of a general task by utilizing scripted scattering and gathering agents. For example, a main task entered as task 39 is first researched against updated database information in order to define the subtasks. Once defined and verified by guard functions as described in FIG. 2, a scattering agent 41 disperses the subtasks to the selected WEB services according to the data type required by those services. For example, WEB communication 45 accomplished via browsing technique would use HTML or other suitable languages. POP3 communication 47 would cover e-mail. News communication 49 would cover such as instant messaging and posting.

A means for WEB calendar scattering 51 provides an update function to the user's calendar service. For example, if for some reason a flight cannot be obtained, then a notification may be routed back to a user's WEB calendar service alarming him of a need to reschedule. A means for contact management and message dissemination is also provided for multicasting a message and disseminating responses according to various formats used at various WEB services.

Once subtasks are performed or verifiably assured, a gathering agent represented by element 43 collects and disseminates all of the required data from various WEB services and presents the data to the user. Such data may include additional calendar entries at a user's calendar service such as scheduled time of flight arrival, scheduled availability of hotel room, and so on. Moreover, if a user coordinates with a mapping service, detailed maps may be provided illustrating directions to meetings, hotels, and so on.

Application Layer Multicast Architecture (ALMA)

In another aspect of the present invention, a user is enabled to unify WEB messaging and posting to a plurality of WEB servers from a single-point interface. The inventor defines ALMA as a contact management and dissemination service integrated as a feature of software 27 of FIG. 1. Such means was briefly described in FIG. 3 and is represented by element number 53. ALMA may be configured by a user to operate as either a unidirectional implementation (no responses required) or as a bi-directional implementation (responses gathered).

Figure 4:
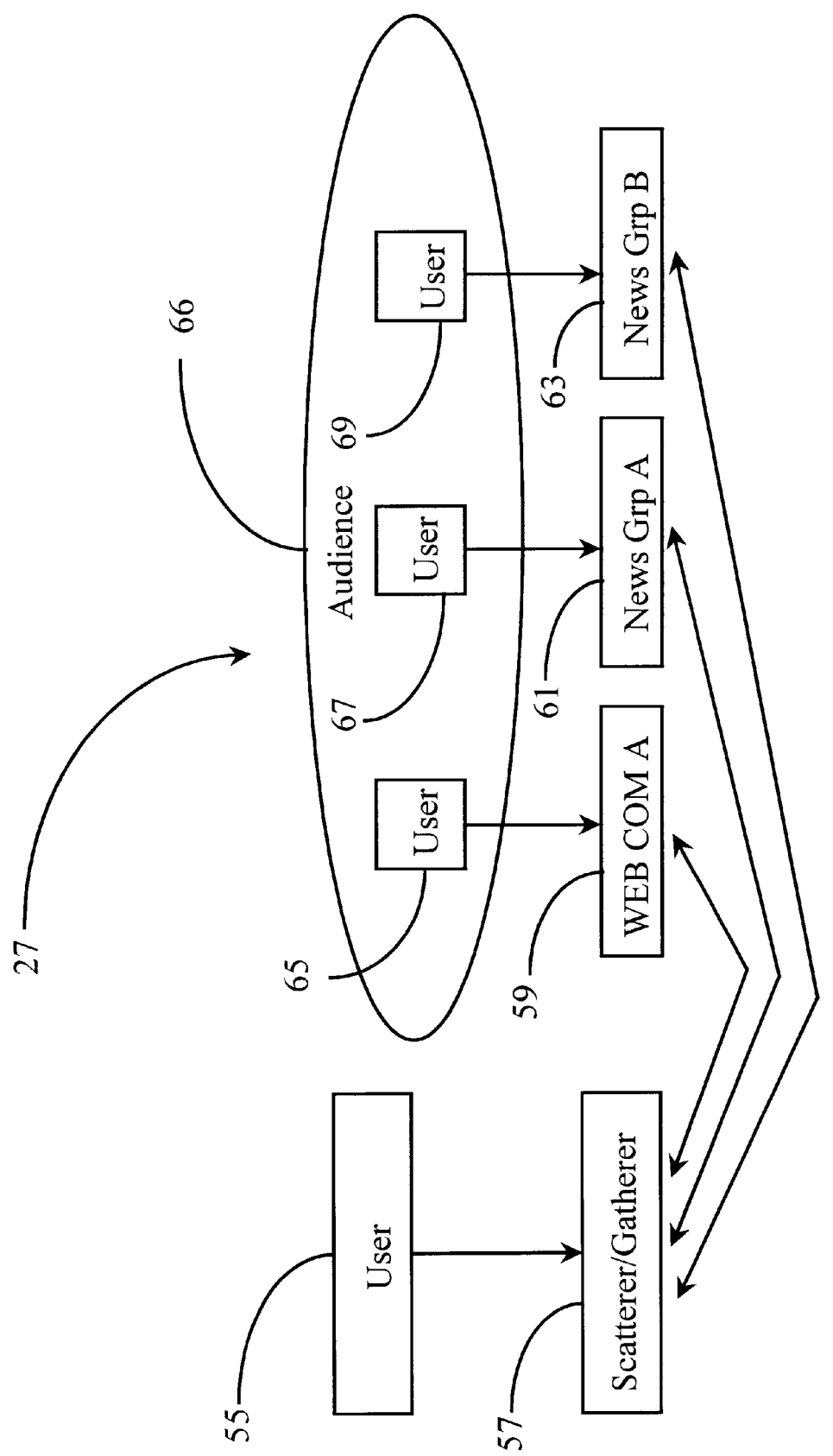
FIG. 4 is a block diagram illustrating contact management message dissemination, propagation, and response gathering capabilities of the software according to an embodiment of the present invention.

FIG. 4 is a block diagram illustrating contact management message dissemination, propagation, and response gathering capabilities of the software of FIG. 1 according to an embodiment of the present invention.

In typical contact management, a user must visit numerous WEB sites in order to post messages and gather responses from such as news groups, message boards, job services, and so on. This task can be quite time consuming depending on the nature of the message and number of sites hosting the message. However, in this example of ALMA, a user may operate from a single-point interface without physically visiting such sites as is described below.

A user 55 decides to post a request for knowledge about a certain topic to a plurality of sites illustrated in this example as WEB community 59, news group A (61), and news group B (63). An audience 66 comprises users 65, 67, and 69, which are communicating with their respective services as illustrated by the directional arrows emanating from users 65–69 and propagating toward services 59–63. Services 59–63 are subscribed to by user 55 as well, and have required parameters entered into such as repository 25 of FIG. 1. In this way, a user may select services that are topically appropriate to his or her request.

ALMA uses scattering/gathering agents 57 in much the same manner as the task scattering and gathering described in FIG. 3 using a same single-point interface. Scatterer 57 multicasts a single request to selected posting services 59–63. Message dissemination scripts are used to format the request of user 55 into acceptable formats generic to services 59–63, and to reformat back to user 55 (bi-directional mode). As users 65–69 respond to the posted request, gatherer 57 collects the responses and routes them back to the interface of user 55. The bi-directional nature of scattering and then gathering is illustrated herein by the bi-directional arrows connecting means 57 to services 59–63 respectively. By using this method, a user does not have to visit several WEB sites to post messages and gather responses.

As described above, ALMA may also be used in a unidirectional fashion. For example, if user 55 is posting a job resume, and services 59–63 are WEB-based job centers, then unidirectional implementation is appropriate. Users 65–69 representing employers may choose to respond by conventional means such as e-mail or by telephone.

It will be apparent to one with skill in the art that ALMA may function as an integrated feature of software 27 without departing from the spirit and scope of the present invention. ALMA may share the same user interface and data repository as the previously described method of decomposing tasks and delegating subtasks to various WEB services. In another embodiment, ALMA may be provided as a stand-alone implementation.

As described above, Java scripting is used in some embodiments to implement scatterer/gatherer functions as well as for any automated log-in and password requirements for gaining access to protected sites. Such scripts are understood in the art and known to the inventor. Knowledge workers may prepare, store, and update scripts on behalf of subscribed users. Individual scripts are designed to be generic in basic function allowing for easy and, in some cases, automated modification or tailoring for specific user implementations. In many cases, advanced users may create and tailor their own scripts using a provided tool-kit. There are many possibilities.

As described above, a user may practice ALMA from a single-point interface such as from within a WEB browser application. A basic process exhibiting bi-directional ALMA is detailed below.

Figure 5:
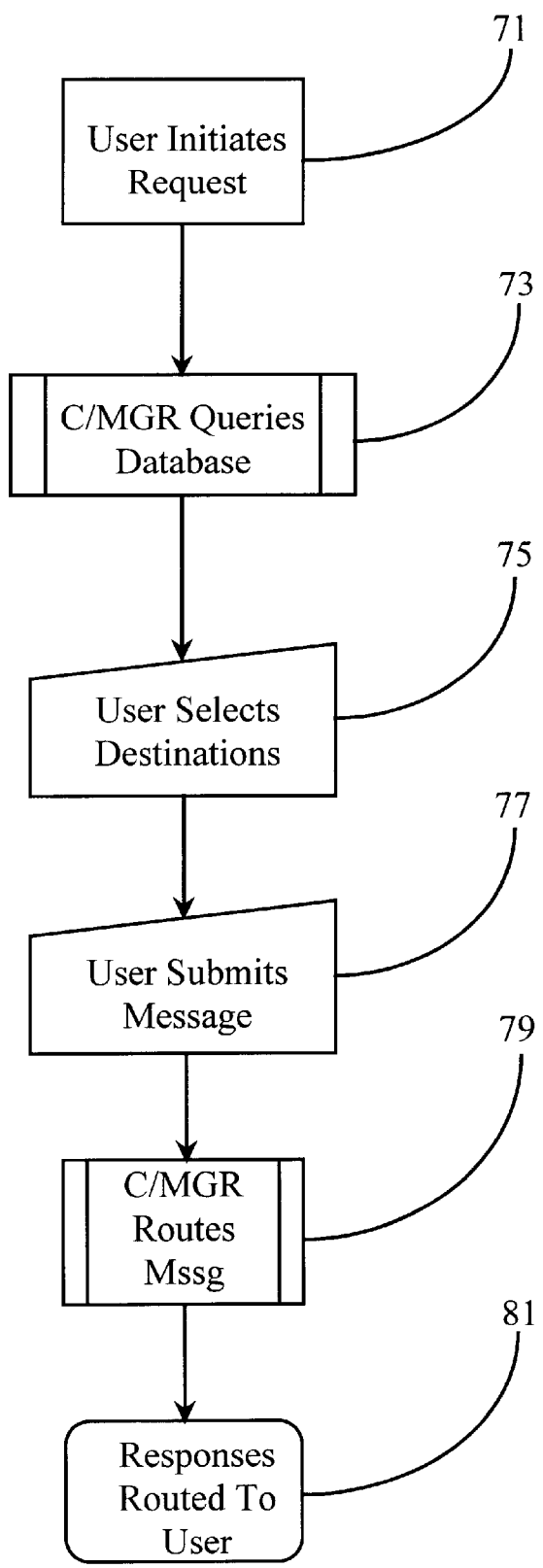
FIG. 5 is a process flow chart illustrating logical steps practicing message dissemination, propagation and response gathering functions of the software according to an embodiment of the present invention.

FIG. 5 is a process flow chart illustrating logical steps for practicing the ALMA feature of the software of FIG. 1 according to an embodiment of the present invention. At step 71, a user operating from a single-point interface initiates a request. Such a request may be to get response from applicants for a posted rental property or the like.

At step 73, contact management software queries a database such as one held in repository 25 of FIG. 1 and looks for listed sites that would logically accommodate the user request. For example, if the rental property is near a college, then on-line university message boards and the like may be utilized. Similarly, property rental services allowing private rental postings may be utilized. Such services may already be listed in a user's database if the nature of the request is one that is repeatedly implemented such as might be the case of a landlord owning and renting many properties.

In one embodiment, a search function may be used to locate applicable WEB services prior to initiating a request. In another embodiment, the service may maintain a separate database containing a variety of recommended sites. There is theoretically no limit to the number of separate sites that a user may post a same message to.

At step 75, a user selects site destinations to which his or her message will be sent and posted. If applicable or allowed by a site, a user may also configure how long the message should be posted, etc. Such data parameters may be incorporated into scripting if known ahead of time.

At step 77, a user submits a message for posting. At step 79, the contact manager using ALMA disseminates the message for various destinations, and multicasts the message to the various site servers contained in the script. Additional requirements such as any passwords or log-in names to gain access to subscribed-to sites are included in the script logic. At step 81, responses to the user's message are routed back to the user. This may be a periodic process wherein the sites are re-accessed automatically by the gathering agent to check for responses. In some cases, a user may configure a gatherer agent as to when and how often to check for responses to an original posting.

Gathered responses may appear in a user's browser interface as an interactive list of hyperlinks indicating the date, time, and origination (URL) of the site that a particular response was gathered from. By clicking on the body portion of the response, a user may read the response off-line without navigating to the site to view the response. In this case, the responses are completely parsed and downloaded to such as repository 25 of FIG. 1 or, in some cases, the user's own storage system.

In another embodiment, a gathering agent may simply notify a user of the existence of responses, perhaps listing the date, time, URL, and number of responses. In this case, the user would navigate to desired URL's to view the responses. In still another embodiment representing unidirectional ALMA, a user may direct that all responses be sent by e-mail from responders. There are many possibilities.

It will be apparent to one with skill in the art that the method and apparatus of the present invention may be practiced over a variety of architectures comprising data-packet network equipment and appropriate user operated devices without departing from the spirit and scope of the present invention. For example, a user may practice the present invention from a corporate local area network (LAN), from a private residence over a PSTN network, from a mobile position using a wireless device, and so on.

In one embodiment, the service of the present invention may be scaled up by using a powerful processor and many connected WEB services such that logistics or the like may be evaluated for complicated tasks such as simulated civilian evacuation models or flood preparedness drills.

The method and apparatus of the present invention should be afforded the broadest possible scope in view of the many possible embodiments described herein and known to the inventor. The spirit and scope of the present invention should be limited only by the claims that follow.

What is claimed is:

1. An Internet portal system for accomplishing a multi-component task involving interaction with one or more Internet Web sites, comprising:
    an Internet-connected server having access to client-related data;
    an internet-capable client station usable by a client; and
    software executing on the server for managing individual component tasks in execution of the multi-component task;
    wherein the software, in response to initiation of a multi-component task specified by the client, transparently to the client, and without interaction from the client defines the component tasks based on pre-programmed client-related data, identifies third-part Internet Web sources needed for completion of the tasks, performs and manages interaction with the identified Web sites, gathering results of the interactions, integrates the gathered results, and communicates final results to the client at the client station.

2. The system of claim 1 wherein individual ones of the component tasks involve payment for services rendered in the interaction with the one or more Internet Web sites, and wherein one of the component tasks is transfer of funds from a client account in payment for the service rendered.

3. The system of claim 1 wherein the software provides an input interface for the client to define a task.

4. The system of claim 3 wherein the input interface enables the client to participate in defining component tasks and in selecting the Web sites for completion of component tasks.

5. The system of claim 1 wherein the multi-component task involves arranging services for a trip, including one or more of airline reservations, lodging reservations, or reservation of a rental vehicle.

6. The system of claim 1 wherein the component tasks comprise messages to be sent to individual ones of multiple Web servers.

7. The system of claim 6 wherein the messages sent require answers, and the component tasks further comprise gathering the answers and communicating the answers to the client.

8. A method for accomplishing, after initiation by a client and completely transparent to a client and without interaction from the client following the initiation, a multi-component task involving interaction with one or more Internet Web sites, comprising steps of:
    (a) defining component tasks based on pre-programmed client-related data by software executing on the Internet-connected subscription server;
    (b) identifying third-party Web servers for completion of the component tasks;
    (c) managing execution of the component tasks by the software, including interaction with the Web servers identified, and
    (d) gathering and integrating results of the component tasks and communicating final results to the client at the client station.

9. The method of claim 8 wherein individual ones of the component tasks involve payment for services rendered in the interaction with the one or more Internet Web sites, and wherein one of the component tasks is transfer of funds from a client account in payment for the service rendered.

10. The method of claim 8 wherein the software provides an input interface for the client to define a task.

11. The method of claim 10 wherein the input interface enables the client to participate in defining component tasks and in selecting the Web sites for completion of component tasks.

12. The method of claim 8 wherein the multi-component task involves arranging services for a trip, including one or more of airline reservations, lodging reservations, or reservation of a rental vehicle.

13. The method of claim 8 wherein the component tasks comprise messages to be sent to individual ones of multiple Web servers.

14. The method of claim 13 wherein the messages sent require answers, and the component tasks further comprise gathering the answers and communicating the answers to the client.

* * * * *